United States Patent
Gens

Patent Number: 5,135,565
Date of Patent: Aug. 4, 1992

[54] RECOVERY OF ALUMINUM FROM DROSS USING THE PLASMA TORCH

[75] Inventor: Theodore Gens, North Plainfield, N.J.

[73] Assignee: The BOC Group, Inc., New Providence, N.J.

[21] Appl. No.: 686,094

[22] Filed: Apr. 16, 1991

[51] Int. Cl.$^5$ .............................................. C22B 4/00
[52] U.S. Cl. ..................................... 75/10.21; 75/672
[58] Field of Search ............................. 75/10.21, 672

[56] References Cited

U.S. PATENT DOCUMENTS

| | | | |
|---|---|---|---|
| 1,066,833 | 7/1913 | McClenahan | 75/673 |
| 3,586,613 | 6/1971 | Stewart | 75/10.21 |
| 3,851,136 | 11/1974 | Venus | 75/10.21 |
| 3,938,988 | 2/1976 | Othmer | 75/10.21 |
| 4,177,060 | 12/1979 | Tylko | 75/10.21 |
| 4,960,460 | 10/1990 | Dube | 75/10.21 |
| 4,997,476 | 3/1991 | Lindsay | 75/10.21 |

*Primary Examiner*—Peter D. Rosenberg
*Attorney, Agent, or Firm*—Carol A. Nemetz; Robert I. Pearlman

[57] ABSTRACT

A process and apparatus for recovering aluminum from a solid dross containing the same comprising: (a) continuously introducing the dross and lime flux into an inert gas DC transferred arc plasma torch furnace, (b) heating the mixture to above the slag melting point to form two immiscible layers, and (c) periodically removing the upper aluminum layer and the lower residual slag layer.

13 Claims, 1 Drawing Sheet

RECOVERY OF ALUMINUM FROM DROSS USING THE PLASMA TORCH

TECHNICAL FIELD

This invention relates to the recovery of aluminum metal from dross using a plasma torch.

BACKGROUND OF THE PRIOR ART

When aluminum is smelted, a dross is skimmed off the surface of the motel metal. This dross contains aluminum oxide, aluminum nitride, and various other metal impurities, including a substantial amount of entrained metal. The metal is often 25 to 80% by weight of the dross, averaging about 50%. Some other metals including silicon, iron, lead and cadmium are found in the dross in smaller amounts which vary greatly with the source of the dross. The dross usually include some salt, in the form of principally sodium and potassium chloride. The amount of such salt varies greatly, and can be in the range 10 to 50 weight percent of the dross. It is desirably to recover as much of the aluminum metal as possible from the dross both to obtain usable product and to reduce the volume of waste product. While the dross of secondary smelters is not valuable enough to ship back to the primary smelters, practically all dross is processed to recover aluminum metal and the slag residue after processing is transported to landfills for disposal.

A commercial process of aluminum recovery involves crushing, sizing, and melting the metal from the dross under a salt flux, which usually consists of a eutectic mixture of sodium chloride and potassium chloride plus one to five percent cryolite or calcium fluoride. Flux is a substance that causes other substances to melt more readily by dissolving their oxides or surface impurities. This commercial aluminum recovery usually takes place in a rotating furnace with a mixture of the dross and salt flux in the ratio of one part dross to as much as one part salt flux. The mixture is heated to above the melting point of the aluminum and salt flux, while the aluminum oxide remains solid. Molten salt flux selectively wets the oxide of the dross and promotes separation of the molten metallic aluminum from the solid oxide fraction. At the same time, the aluminum is protected from oxidation by the salt flux. The denser molten metal sinks. After melting is completed, the floating mixture of oxide and salt can be poured from the furnace for disposal in a land fill, and the separated metal layer can be recovered free of salt and oxide.

Primary and secondary smelting plants in the United States generate over 200,000 tons per year of dross, with estimates ranging from 300,000 to 500,000 tons per year. Salts added during processing can be leached from the residues by rainfall and the leachate can contaminate both surface and ground waters. In addition, the salts volatilize during processing, forming corrosive fumes that are discharged into the atmosphere. These environmental problems could result in restrictions on the dumping of the residues or the use of the salt flux. Either action could have the effect of reducing the recovery of aluminum.

There are two principal types of plasma torches. If only one electrode is in the torch, and the other electrode is the material to be heated, the plasma torch is of the transferred arc type. If both electrodes are within the plasma torch, the torch is said to be non-transferred.

EP 0 322 207 A2 filed Dec. 21, 1988 describes the batch recovery of non-ferrous metals, particularly aluminum, from dross without utilizing the conventional gas fired treatment with a molten salt bath, and is carried out in a rotary furnace utilizing using plasma torch heating. An arc plasma torch, preferably non-transferred, is used to heat air, nitrogen, argon, or other gases or mixtures, which heated gas is then directed upon the rotating dross charge to melt and separate the aluminum metal from the oxide portion of the dross. When separation is accomplished, the recovered metal is tapped off. Following this, the dross residue is scraped from the reactor. The amount of residue is less than in the conventional treatment where salt is added, thereby decreasing the severity of disposal problems.

U.S. Pat. No. 4,877,448 describes a process for recovering aluminum metal and aluminum oxide from dross in a furnace using plasma torch heating. Air is heated in the plasma torch to melt the charge, preferably in a rotating drum furnace. Some of the metal is oxidized, producing a portion of the heat required. After the torch is turned off, molten aluminum is discharged by tilting the drum. Residual aluminum oxide is scraped from the drum.

U.S. Pat. No. 4,997,476 describes a process for recovering aluminum and aluminum oxide in a rotary furnace using plasma torch heating. A variety of arc gases, preferably air, is heated in the plasma torch and directed upon the rotating dross charge to separate and agglomerate the free aluminum from the dross residue without need for the conventional molten salt bath. When separation is accomplished, the recovered metal is tapped off. After each run, or after two or three runs, the aluminum oxide dross residue is scraped from the walls of the furnace. The amount of residue is less than in the conventional treatment wherein salt is added, thereby decreasing the severity of disposal problems.

J. Meunier, et al., "Aluminum Recovery from Dross: Comparison of Plasma and Oil-fired Rotary Furnaces", 9th International Symposium on Plasma Chemistry (ISPC-9), Italy (1989) compares the batch aluminum recovery from dross in non-transferred arc plasma torch and oil-fired furnaces. Both nitrogen and air were tested as the plasma gas for the plasma furnace, and air was used for the oil-fired furnace; fluxing salts were used only in the oil-fired furnace. The aluminum was poured into pigs and weighed and the residue in the furnaces was collected and weighed for mass balances. The plasma torch gave better recoveries of aluminum when air was used in both furnaces. The recovery of aluminum was improved still further, to 94.5%, using nitrogen in the plasma torch. Equivalent energy efficiencies of close to 30% were measured for both processes.

D. Montagna, "A Fluxless Method for Reclaiming Aluminum from Dross," U.S. Bur. of Mines Rep. Invest., RI 8288 (1978) describes a batch salt-free fluxless method for reclaiming metallic aluminum from aluminum dross. The dross is smelted under argon, nitrogen, or carbon dioxide in an externally heated electric-pot furnace. This pot furnace does not contain a plasma arc, and requires a stirring mechanism to separate the melted metal from solid oxide. The pot furnace is tilted to pour out the uppermost molten aluminum layer. The bottom fluxless residue layer can be resold to steel companies for hot-topping of steel ingots or discarded. Use of argon led to recoveries equal to that in commercial rotary-type furnaces with salt flux, but the amount of residue generated is less.

SUMMARY OF THE INVENTION

A process and apparatus for recovering aluminum from a solid dross containing the same comprising: (a) continuously introducing the dross and lime flux into an inert gas DC transferred arc plasma torch furnace, in a weight ratio of lime flux to aluminum oxide of between 0.8 and 1.4, preferably between 1.0 and 1.2, (b) heating the mixture of dross and lime flux via the torch to above the slag melting point of 1400° C., but below 2000° C., to form two immiscible layers, and (c) periodically removing the upper aluminum layer separated from the dross and removing the lower residual slag layer.

DETAILED DESCRIPTION OF THE INVENTION

Figure 1:
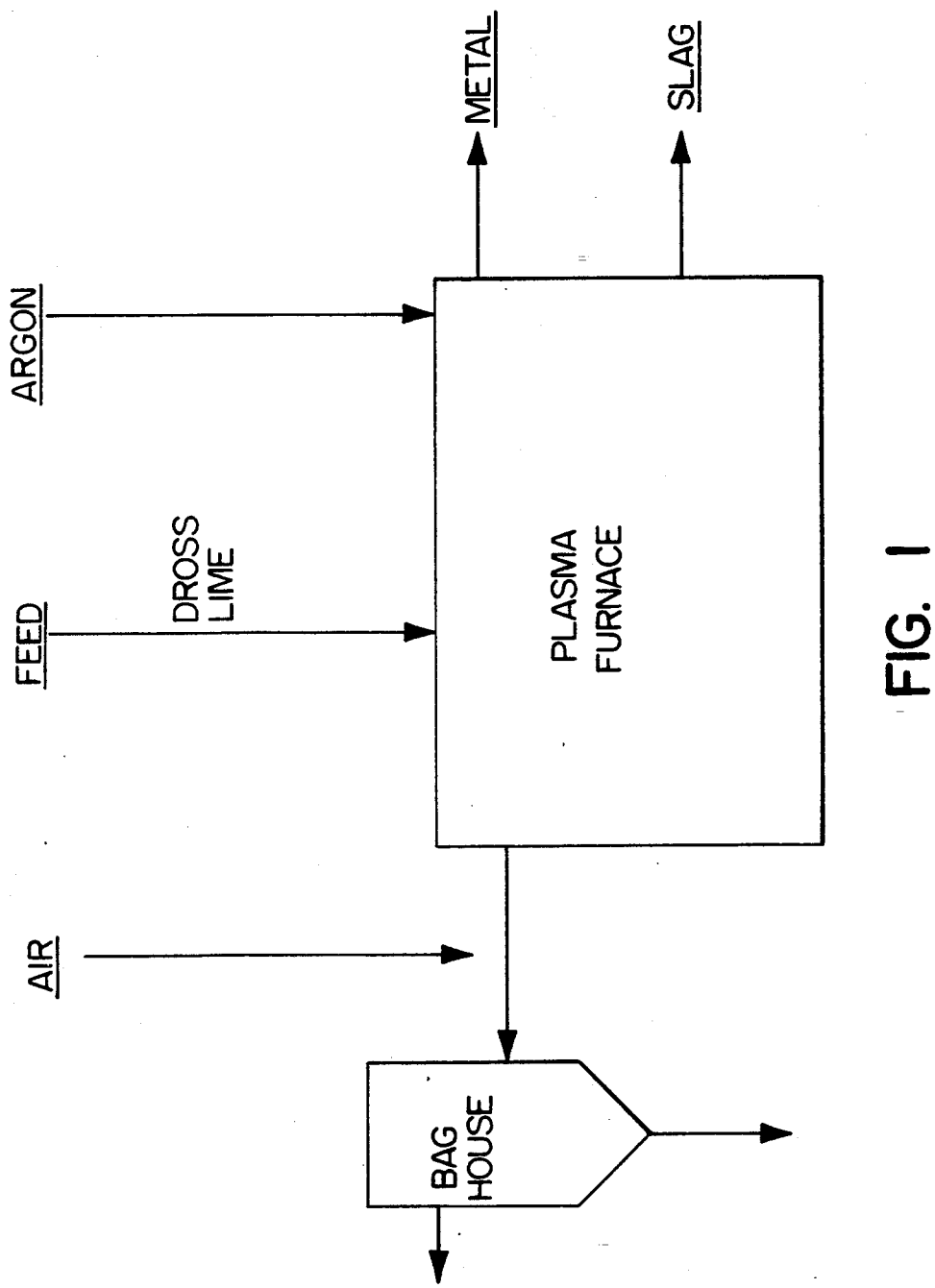
FIG. 1 shows a schematic dross separation process.

Aluminum dross, consisting mostly of aluminum metal and alumina (which is aluminum oxide or $Al_2O_3$), is completely melted in a stationary reactor equipped with a transferred arc DC plasma torch. For purposes of the present invention, a non-transferred DC plasma torch will require much larger quantities of inert gas. The alumina component is melted by fluxing with lime, comprising substantially calcium oxide (CaO), alone or with other fluxing agents not containing potassium or sodium chloride salts, to form a molten slag.

The dross and lime flux are fed continuously into the reactor, using a screw feeder or other type of continuous feeder. A high temperature of at least about 1400° C. is needed to form melting slag in the presence of lime flux. It is not necessary to heat above the aluminum oxide melting point (alpha aluminum oxide melts at 2054° C. and gamma aluminum oxide melts at 2018° C.).

Two liquid layers are formed. Unlike the conventional salt process, the aluminum layer floats upon the denser slag layer. This separation into two immiscible liquid layers provides a means for separating and recovering the aluminum metal that was originally entrapped in the dross. The aluminum is recovered and the slag is removed by periodically tapping the reactor and separately withdrawing each of the two liquid layers. The period is chosen by one skilled in the art based upon the rate of production of each layer and the size of the furnace crucible to avoid approach of the metal/slag boundary layer to the reactor tap orifices.

Inert gas is passed continuously through the plasma torch during the process. The inert gas is a non-oxidizing gas such as helium, neon, etc., but preferably argon. This inert gas performs several functions: to protect the plasma torch from corrosive attack by other gases, to initiate and carry the DC plasma column, and to blanket the molten aluminum and prevent it from forming oxide or nitride. Inert gas consumption is minimized by using a transferred arc torch with a tungsten cathode. The anode of the transferred arc DC plasma torch is the material to be heated (i.e., the dross). The plasma torch equipment may be manufactured by Tetronics Research & Development Co., e.g. Model 100 KW.

The slag product is mainly calcium aluminate, which has value in the steel industry. The calcium aluminate has a molar ratio of $CaO/Al_2O_3$ of about 1.5 to 2.5, and preferably close to 2.0. A ratio of 2.0 yields a melting point of about 1400° C., the lowest attainable for this binary compound. After cooling, the slag is a strong, hard rocklike material with properties such as high melting point which make it useful in thermal or electrical insulating and structural applications.

The conversion of the dross into two immiscible liquid phases permits easy and complete recovery of aluminum. The use of salt mixture (e.g. NaCl-KCl), practiced in conventional processing, is avoided, along with the attendant waste disposal problems. This use of salt is discussed in Montagna at 1. The advantage of an argon atmosphere in decreasing the need for salt, described in Montagna's conclusions, is also applicable using the argon plasma torch. Losses by formation of aluminum nitride, mentioned in Meunier's Table 1, are avoided by using argon or other inert gases in the plasma torch. A rotary furnace is not required as in Meunier and EPO 322 207. Also, the stirring mechanism of Montagna is not required. The slag product of the present invention has valuable properties which make this a useful product, rather than a troublesome waste.

The aluminum recovery process of the present invention may be integrated with aluminum smelting so as to avoid the thermite reaction which can convert much of the aluminum metal in the dross to alumina when the dross must be stored, awaiting processing.

It is preferable to utilize a graphite crucible for the furnace to both withstand the high processing temperature and to react in a self-limiting manner to form an aluminum carbide solid barrier coating at the aluminum-graphite or slag-graphite interface. Protective coatings on the graphite crucible, including boron nitride (BN) and conductive zirconium boride ($ZrB_2$), simply painted on as a suspended slurry, are useful.

The lime fluxing agent should give as low a melting slag as feasible. Calcium fluoride may be added to the calcium oxide fluxing agent to lower the melting temperature. A potential application of the slag is in desulfurizing steel, and a small amount of calcium fluoride is often desired in this application.

EXAMPLE 1

A 15 kg sample of aluminum dross (40% Al-50% $Al_2O_3$-10% salt, where the salt composition is 47.5% NaCl-47.5% KCl-5% $CaF_2$) was mixed with 7.5 kg anhydrous lime (CaO), and fed, by use of a screw feeder at a rate of 0.3 kg/min, into the reactor preheated to about 1600° C. with an argon and water cooled 100 KW DC transferred arc plasma torch. The DC power to the torch was 600 amps at 105 to 125 volts. The temperature of the resultant melt was maintained by these conditions at 1550° to 1650° C. throughout the run. The reactor was cooled and the product fractions were collected and analyzed. The aluminum ingot weight 5.7 kg, amounting to 95% of the aluminum introduced with the dross. The slag fraction weighed 16.8 kg; it accounted for essentially all of the alumina, lime, and $CaF_2$, along with about 75% of the KCl and 85% of the NaCl introduced. Its composition was approximately 90% calcium aluminate and 7% mixed salts. The slag also contained some trapped aluminum metal and aluminum converted to oxide by undesired, but not completely avoidable, reaction with moisture and oxygen, which accounted for most of the aluminum not recovered as metal. The dust collected in the baghouse weighed 0.4 kg and consisted mostly of KCl and NaCl, with only 0.01 kg of aluminum oxide from volatilized aluminum vapor, and a small amount of lime that was entrained in the effluent gas from the reactor.

EXAMPLE 2

A 20 kg sample of aluminum dross of the same composition as Example 1 was mixed with 10 kg anhydrous lime and fed, by use of a screw feeder at a rate of 0.3 kg/min, into the reactor preheated to about 1500° C. with the same plasma torch described above. The DC power to the torch was 500 amps at 100 to 120 volts. The temperature of the resultant melt was maintained at 1450° to 1570° C. throughout the run. The reactor was cooled and the product fractions were collected and analyzed. The aluminum ingot weighed 7.5 kg, amounting to 94% of the aluminum introduced with the dross. The slag fraction weighed 22.5 kg; it accounted for essentially all of the alumina, lime, and $CaF_2$, along with about 90% of the KCl and 95% of the NaCl introduced. Its composition was approximately 89% calcium aluminate and 8% mixed salts. The slag also contained some trapped aluminum metal and aluminum converted to oxide by undesired, but not completely avoidable, reaction with moisture and oxygen, which accounted for almost all of the aluminum not recovered as metal. The dust collected in the baghouse weighed 0.2 kg and consisted mostly of KCl and NaCl, with only traces of aluminum oxide and a small amount of lime that was entrained in the effluent gas from the reactor.

I claim:

1. A process for recovering aluminum from a solid dross containing the same comprising:
   (a) continuously introducing the dross, substantially comprising aluminum metal and aluminum oxide, and lime flux into an inert gas DC transferred arc plasma torch stationary furnace, in a weight ratio of lime flux to aluminum oxide of between 0.8 and 1.4, and
   (b) heating the mixture of dross and lime flux via the torch to above the slag melting point of about 1400° C. but below 2000° C. to form two immiscible layers, and
   (c) periodically removing the upper aluminum layer separated from the dross and removing the lower residual slag layer.

2. The process of claim 1 wherein the inert gas is argon.

3. The process of claim 1 wherein the weight ratio of lime flux to aluminum oxide is between 1.0 and 1.2.

4. The process of claim 1 wherein the lime flux is calcium oxide.

5. The process of claim 1 wherein the lime flux is calcium oxide and calcium fluoride.

6. The process of claim 1 wherein a graphite crucible of the furnace is coated with $ZrBr_2$ or BN.

7. Apparatus for recovering aluminum from a solid dross containing the same comprising:
   (a) a stationary furnace useful for continuously introducing the dross, substantially comprising aluminum metal and aluminum oxide, and lime flux in a weight ratio of lime flux to aluminum oxide of about between 0.8 and 1.4, and
   (b) an inert gas DC transferred arc plasma torch in the furnace for heating the mixture of dross and lime flux to above the slag melting point of about 1400° C. but below 2000° C. to form two immiscible layers, and
   (c) means for periodically removing the upper aluminum layer separated from the dross and removing the lower residual slag layer.

8. The apparatus of claim 7 wherein the inert gas is argon.

9. The apparatus of claim 7 wherein the weight ratio of lime flux to aluminum oxide is between about 1.0 and 1.2.

10. The apparatus of claim 7 wherein the lime flux is calcium oxide.

11. The apparatus of claim 7 wherein the lime flux is calcium oxide and calcium fluoride.

12. The apparatus of claim 7 wherein the furnace comprises a graphite crucible coated with $ZnBr_2$ or BN for introduction of the dross.

13. The apparatus of claim 7 wherein the plasma torch has a tungsten cathode.

* * * * *